(12) United States Patent
Dubiel et al.

(10) Patent No.: US 11,261,920 B2
(45) Date of Patent: Mar. 1, 2022

(54) SEAL AND VENT ASSEMBLY FOR A VEHICLE DRIVELINE

(71) Applicant: Neapco Intellectual Property Holdings, LLC, Farmington Hills, MI (US)

(72) Inventors: Nick Dubiel, Fenton, MI (US); Robert J. Wehner, Livonia, MI (US); Riki Patel, Sterling Heights, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 298 days.

(21) Appl. No.: 16/449,773

(22) Filed: Jun. 24, 2019

(65) Prior Publication Data

US 2020/0003263 A1   Jan. 2, 2020

Related U.S. Application Data

(60) Provisional application No. 62/690,589, filed on Jun. 27, 2018.

(51) Int. Cl.
*F16D 3/84* (2006.01)
(52) U.S. Cl.
CPC ............ *F16D 3/84* (2013.01); *Y10S 277/928* (2013.01); *Y10S 464/906* (2013.01); *Y10T 137/789* (2015.04)
(58) Field of Classification Search
CPC ...... F16D 3/84; F16D 3/223; F16D 2003/846; F16D 3/848; Y10S 464/906; Y10S 277/928; Y10T 137/789

USPC .......................................................... 464/17
See application file for complete search history.

(56) References Cited

U.S. PATENT DOCUMENTS

| | | | | | |
|---|---|---|---|---|---|
| 2,571,893 | A | * | 10/1951 | Kendall .............. | H01M 50/308 137/854 |
| 5,507,318 | A | * | 4/1996 | Israelson ............. | F04B 53/1065 137/854 |
| 6,722,991 | B2 | * | 4/2004 | Chrobak ................. | F16D 3/845 464/17 |
| 7,204,760 | B2 | | 4/2007 | Wang | |
| 8,327,848 | B2 | * | 12/2012 | Ho ...................... | A61M 16/208 |
| 2008/0142102 | A1 | * | 6/2008 | Savard ................ | F04B 53/1065 137/854 |

* cited by examiner

*Primary Examiner* — Greg Binda
(74) *Attorney, Agent, or Firm* — Dickinson Wright PLLC

(57) ABSTRACT

A seal and vent assembly for a constant velocity joint including a vent plate for being disposed in a compartment of the constant velocity joint. The vent plate defines a mounting aperture. A vent valve is received in the mounting aperture for sealing the compartment of the constant velocity joint. The vent valve has a body portion extending along an axis and received by the mounting aperture and a rim portion extending from the body portion into engagement with, and biased against the vent plate. The vent valve defines a chamber between the rim portion, the body portion and the vent plate. A venting channel fluidly connects the chamber of the vent valve and the compartment of the constant velocity joint. The vent plate defines the at least one venting channel.

9 Claims, 3 Drawing Sheets

SEAL AND VENT ASSEMBLY FOR A VEHICLE DRIVELINE

CROSS-REFERENCE TO RELATED APPLICATION

This application claims priority to U.S. Provisional Application No. 62/690,589 filed Jun. 27, 2018 and entitled "Solid Body Umbrella Vent for CV Joint", which is incorporated herein by reference in its entirety.

FIELD

The present disclosure relates generally to vehicle driveline components, such as constant velocity joints. More particularly, the present disclosure is directed to a seal and vent assembly for preventing contaminants from entering a compartment of a component, such as a continuous velocity joint, of a driveline while allowing high pressure air to escape the compartment.

BACKGROUND

This section of the written disclosure provides background information related to vents for constant velocity joints and is not necessarily prior art to the inventive concepts disclosed and claimed in this application.

Technological advancements continue to improve the performance of automobiles, including the prevention of deformation (i.e., ballooning), of boot seals, such as those used in constant velocity joints. At least one constant velocity ("CV") joint is typically used in the drivelines of an automobile. In operation, the driveline (including the CV joints) may be exposed to water and/or other debris. For example, it is not uncommon for the driveline to be exposed to water, either as a result of the automobile driving through standing water puddles or even deeper water, such as fording a stream. The CV joint may include a number of internal components, and in between those components air is trapped by a seal that prevents external contaminants from contacting the internal components. The air inside of the CV joint may become heated during operation (i.e., rotation) of the CV joint as part of the automobile driveline. As such, the air trapped within the CV joint may increase in pressure in relation to the outside (i.e., ambient) air. A vent assembly is employed as part of the CV joint in order to relieve this pressure in a controlled manner, while still protecting the CV joint from water and/or debris intrusion.

An example of a seal and vent assembly for a CV joint is disclosed in U.S. Pat. No. 7,204,760 to Wang et al. The seal and vent assembly includes a vent plate sealing a compartment of the CV joint from contaminants. The vent plate defines a mounting aperture. A vent valve has a body portion that is received by the mounting aperture. The body portion extends along an axis and is received by the mounting aperture. The vent valve also has a rim portion that extends from the body portion into engagement with, and biased against the vent plate. The vent valve defines a chamber between the rim portion, the body portion and the vent plate. A plurality of venting channels are defined by a sidewall of the body portion of the vent, and fluidly connect the chamber of the vent valve and the compartment of the driveline for allowing air to pass from the compartment, through the venting channels into the chamber, and between the rim portion and the vent plate to the atmosphere during a pressure increase in the compartment, while preventing air from passing from the atmosphere between the rim portion of the vent valve and the vent plate.

An issue with such vent and seal assemblies is that the venting channels are difficult to form or mold with precision on the flexible body of the vent valve. A further issue with such vent assemblies is that the venting channels are prone to deformation when the vent valve body portion is inserted into the mounting aperture of the valve plate. Furthermore, due to the relatively small size of the body of the vent valve, a limited number of venting channels may be formed therein, and the size of such venting channels is limited. Smaller and fewer venting channels may create a higher risk of the venting channels becoming plugged with grease from within the CV joint, or contaminants from outside of the CV joint.

In view of the foregoing, there remains a need for improvements to vent and seal assemblies for CV joints.

SUMMARY

This section provides a general summary of the inventive concepts associated with this disclosure and is not intended to be interpreted as a complete and comprehensive listing of all of its aspects, objectives, features and advantages.

According to an aspect of the disclosure, a seal and vent assembly for a driveline of a vehicle is provided. The seal and vent assembly includes a vent plate for being disposed in a compartment of the driveline to seal the compartment from contaminants. The vent plate defines a mounting aperture. A vent valve has a body portion that extends along an axis and is received by the mounting aperture, and a rim portion that extends from the body portion into engagement with, and biased against the vent plate. The vent valve defines a chamber between the rim portion, the body portion and the vent plate. A venting channel fluidly connects the chamber of the vent valve and the compartment of the driveline for allowing air to pass from the compartment, through the at least one venting channel into the chamber, and between the rim portion and the vent plate to the atmosphere during a pressure increase in the compartment, while preventing air from passing from the atmosphere between the rim portion of the vent valve and the vent plate. The vent plate defines the at least one venting channel.

Because of the location of the at least one venting channel on the vent plate instead of on the body of a vent valve like the prior designs, the venting channel may be cut or stamped with greater precision because it does not have to be molded into an elastomeric member, and it is not prone to deformation like the prior designs. Another advantage associated with locating the venting channel on the vent plate as opposed to a body of a vent valve is that a retention force is larger, thus preventing the vent valve from becoming dislodged in use or during handling prior to use.

DRAWINGS

The drawings described herein are for illustrative purposes only of selected embodiments and not all possible implementations, and are not intended to limit the scope of the present disclosure.

DETAILED DESCRIPTION

Exemplary embodiments will now be described more fully with reference to the accompanying drawings. In particular, a number of non-limiting embodiments of automobile driveline components with an improved seal and vent assembly 10 for a driveline component such as a CV joint is provided so that this disclosure will be thorough and will fully convey the true and intended scope to those who are skilled in the art. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. It should also be appreciated that the present invention can be utilized in connection with other types of automobile components not described fully herein.

The seal and vent assembly 10 will preferably be employed on an automobile driveline component such as a CV joint or other rotational component. For example, the automobile components could be propeller shafts, drive shafts, half shafts, axles, transfer cases, power takeoff ("PTO") units, and/or other components that operate to transmit rotational forces (i.e., rotational energy), between and/or through one or more other automobile driveline components.

Figure 1:
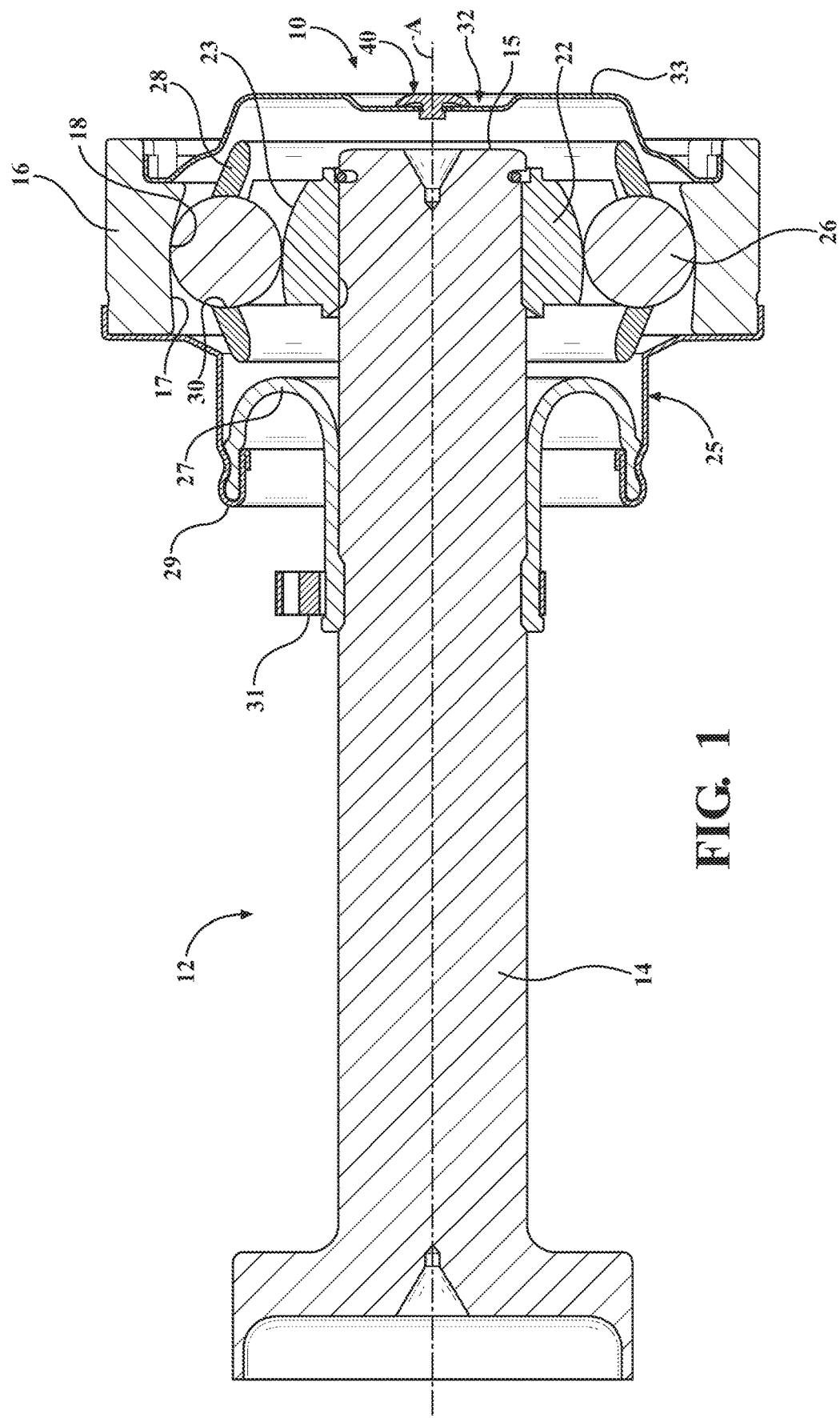
FIG. 1 is a side cross-sectional view of a CV joint including a seal and vent assembly illustrating a first example embodiment of a valve plate and venting valve.

With reference to FIG. 1, an example CV joint 12 is generally shown. The CV joint 12 includes an outer race 16 that extends about an axis A and is configured to be coupled with a first shaft (not shown). The outer race 16 defines a compartment 18. A second shaft 14 extends along the axis A to a terminal end 15 in the compartment 18 of the outer race 16. An inner race 22 is coupled with the terminal end 15 of the second shaft 14 in the compartment 18 and is pivotable relative to the outer race 16 such that the second shaft 14 is also pivotable relative to the outer race 16 and the first shaft. An inner circumference of the outer race 16 defines a plurality of first channels 17 and an outer circumference of the inner race 22 defines a plurality of second channels 23 in circumferential alignment with the first channels 17. A plurality of balls 26 are positioned radially between the outer and inner races 16, 22, each in one of the first and second channels 17, 23, for guiding the pivoting movement of the inner race 22 relative to the outer race 16 while transmitting rotational movement from the outer race 16 to the inner race 22 (or vice versa). A cage 28 is positioned in the compartment 18 between the outer and inner races 16, 22. The cage 28 defines a plurality of openings 30 each receiving one of the balls 26 for aligning the balls 26 in predetermined locations. A first can 25 is fixed to the outer race 16 about the second shaft 14. A boot seal 27 extends radially between, and is sealed against the second shaft 14 and the first can 25. More particularly, the first can 25 has a crimped end 29 that is crimped about a first end of the boot seal 27 in order to seal the first end of the boot seal 27 to the first can 25. Furthermore, a clamp 31 is wrapped annularly about a second end of the boot seal 27 and the second shaft 14 to seal the second end of the boot seal 27 to the second shaft 14. A second can 33 is coupled with the outer race 16 on an opposite axial side of the outer race 16 as the first can 25. Together, the first and second cans 25, 33 and boot seal 27 seal the compartment 18 to prevent contaminants from entering therein.

Figure 2:
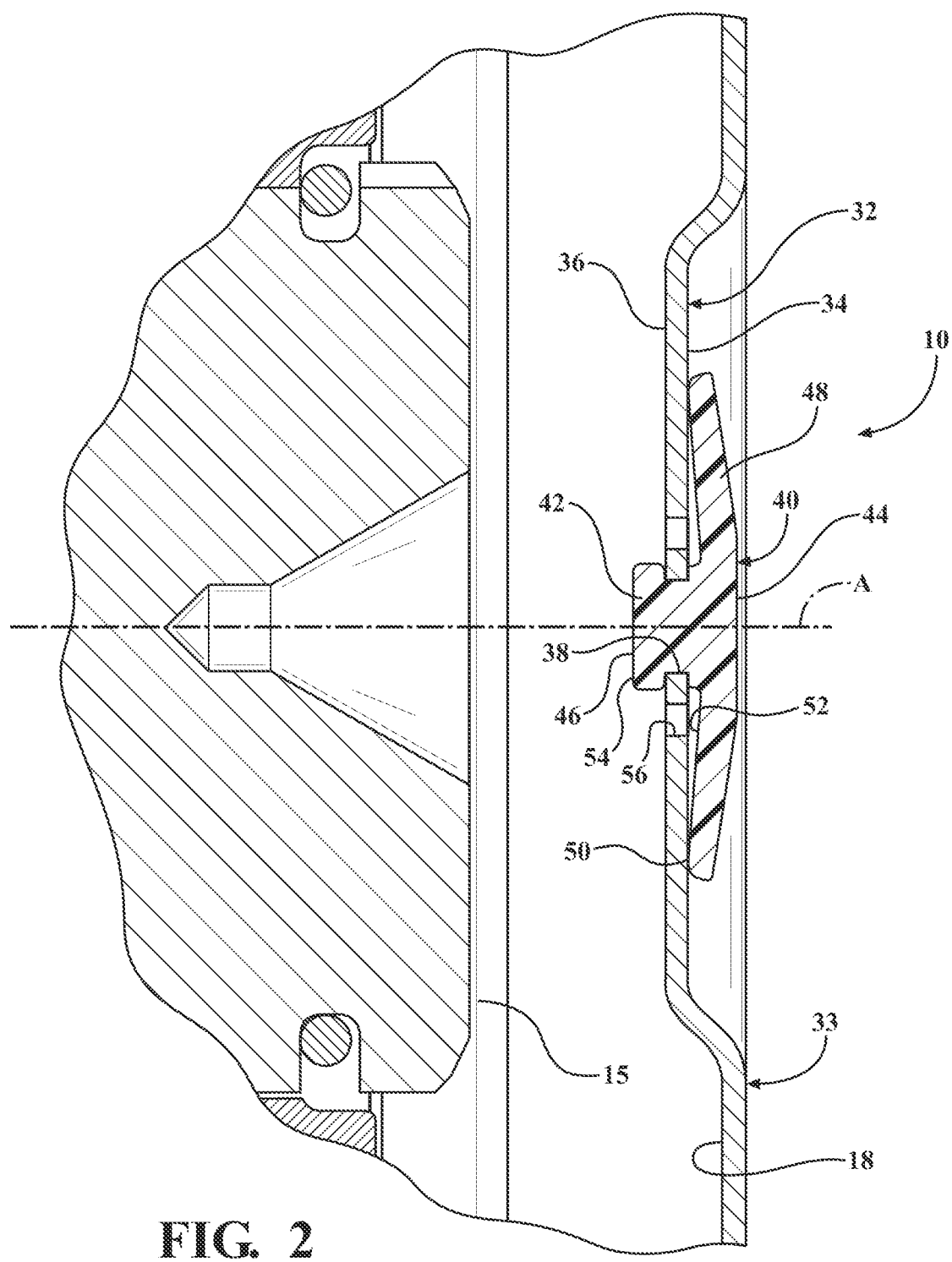
FIG. 2 is a magnified side cross-sectional view of the seal and vent assembly of FIG. 1.
Figure 4:
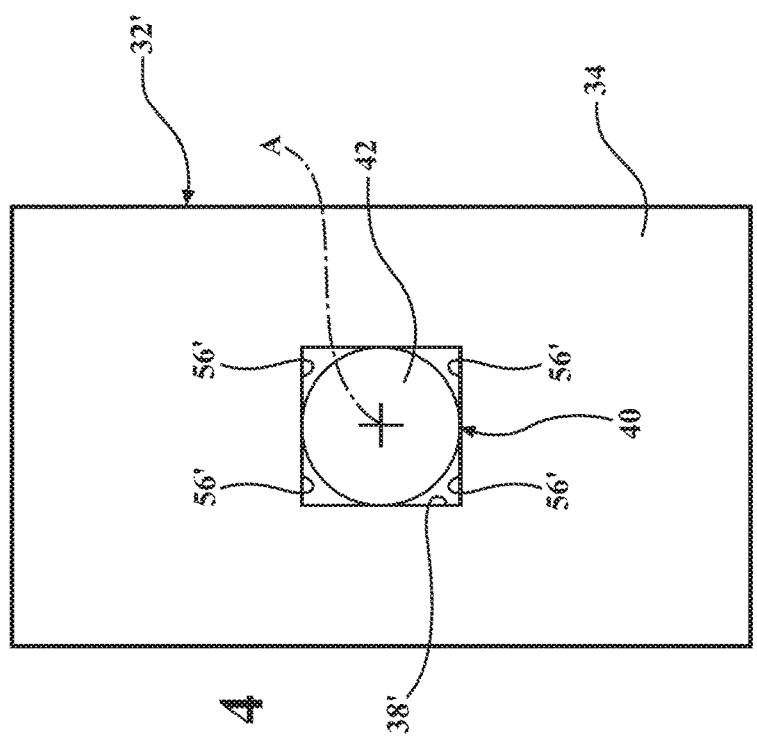
FIG. 4 is a front view of a second example embodiment of a valve plate and venting valve of the seal and vent assembly.
Figure 3:
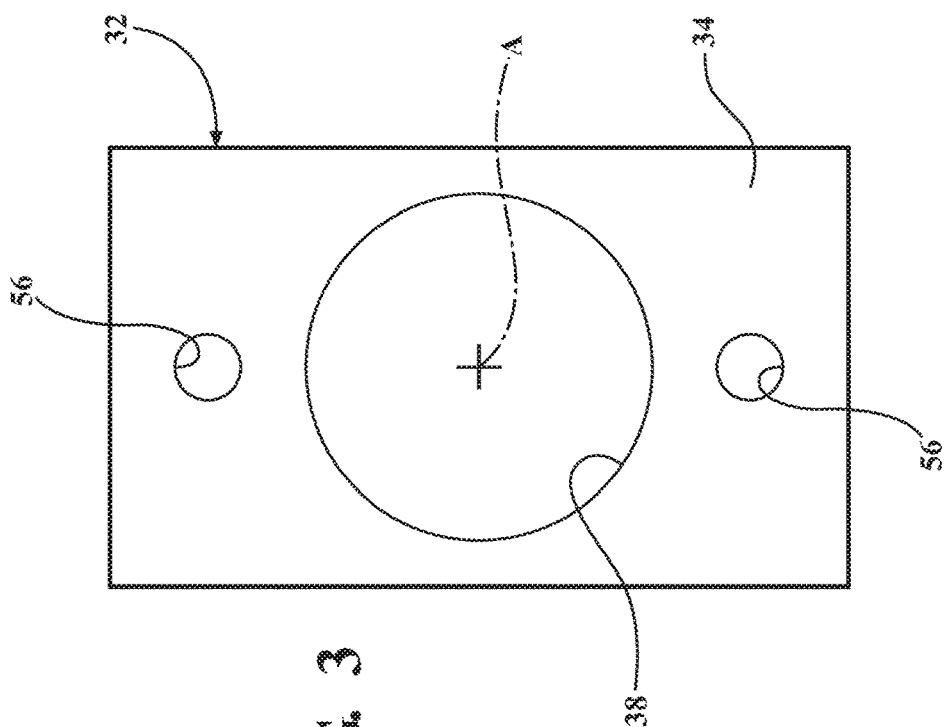
FIG. 3 is a front view of the first example embodiment of the valve plate of the seal and vent assembly.

The seal and vent assembly 10 includes a vent plate 32, 32' that seals the compartment 18. As illustrated in FIGS. 1-2, the vent plate 32, 32' may be a portion of the second can 33, but could be located at other locations, e.g., in a channel of one of the shafts 24. As best illustrated in FIGS. 2-4, the vent plate 32, 32' has a planar top surface 34 and a planar bottom surface 36 opposite the top surface 34. The vent plate 32, 32' defines a mounting aperture 38, 38' between the compartment 18 and outside atmosphere.

As best shown in FIGS. 1-2, the seal and vent assembly 10 also includes a vent valve 40 that is received by the mounting aperture 38, 38' of the vent plate 32, 32' for sealing the compartment 18 of the CV joint 12. The vent valve 40 is made of a flexible material such as, but not limited to, various elastomers. As best shown in FIG. 2, the vent valve 40 has a body portion 42 received in the mounting aperture 38. The body portion 42 extends along the axis A between a proximal end 44 outside of the compartment 18 and a distal end 46 in the compartment 18. The body portion 42 could have a core of a harder material to provide increased structural rigidity. Furthermore, it should be appreciated that the body portion 42 may have various shapes and sizes. The vent valve 40 also has a rim portion 48 that extends from the proximal end 44 of the body portion 42, and extends annularly about the body portion 42. The rim portion 48 tapers radially outwardly and extends to a terminal end 50 that is biased and sealed against the top surface 34 of the vent plate 32, due to the axial position of the body portion 42 relative to the vent plate 32 and flexible material of the rim portion 48. A chamber 52 is defined between the rim portion 48, the body portion 42 and the top surface 34 of the vent plate 40. The vent valve 40 further has a flange portion 54 that extends radially outwardly from the distal end 46 of the body portion 42 and annularly about the body portion 42. The flange portion 54 engages the bottom surface 36 of the vent plate 32 while the rim portion 48 is biased against the top surface 34 of the vent plate 32 such that the vent valve 32 is inhibited from axially moving relative to the vent plate 32 in the mounting aperture 38. The flexible material of the body and flange portions 42, 54 allows the body and flange portion 42, 54 of the vent valve 40 to be deformed such that the body portion 42 may be inserted and secured in the mounting aperture 38 during assembly of the seal and vent assembly 10.

The vent plate 32, 32' defines at least one venting channel 56, 56' that extends into the chamber 52 of the vent valve 40 for allowing air pressure in the compartment 18 to pass through the venting channel 56, 56' and past the vent valve 40 when a pressure differential between air in the compartment 18 and outside of the compartment 18 is higher than a predetermined value. More particularly, as previously noted, air pressure fluctuations in the compartment 18 of the CV joint 12 may result due to expansion and contraction of the air within the compartment 18 during operation of the CV joint 12. In order to prevent ballooning of the boot seal 27 during such pressure increases, the high pressure air is able to escape to the atmosphere by passing through the at least one venting channel 56, 56' into the chamber 52, and between the rim portion 48 of the vent valve 40 and the vent plate 32. At the same time, the arrangement of the rim portion 48 being biased against the top surface 34 of the vent plate 32 prevents air, water and other contaminants from passing from the atmosphere between the rim portion 48 and vent plate 32, 32' into the compartment 18. Once the air pressure differential between air inside the compartment 18 and air outside the compartment 18 decreases to a certain extent, the rim portion 48 is resealed against the top surface 34 of the vent plate 32. As such, the vent valve 40 operates as a one-way valve to allow air to escape the compartment 18 when the air reaches a predetermined pressure, while preventing contaminants from entering the compartment 18. This capability allows the constant velocity joint 12 to meet certain vehicle requirements, such as water fording capability requirements. The type of material and thickness of the rim portion 48 may be selected to provide a predetermined biasing force against the vent plate 32, 32' to accommodate certain pressure increases in the compartment 18 of the CV joint 12. Furthermore, a reinforcing element, e.g., a wire or magnetic element, may be employed to further facilitate the selective sealing of the rim portion 48 against the top surface 34 of the vent plate 32, 32'.

According to the first example embodiment presented in FIGS. 1-3, the at least one venting channel 56 includes two venting channels 56, each spaced from the mounting aperture 38 and positioned on opposite sides of the mounting aperture 38. However, any number of venting channels 56 could be utilized, they could be positioned in various positions, and they can have various shapes, depending on specific needs. By defining the venting channels 56 in spaced relationship with the mounting aperture 38 (as is shown in FIG. 2), flexibility is provided to alter the number, shape, or size of the venting channels 56 to achieve effective venting without plugging or clogging the venting channels 56.

FIG. 4 presents an alternate embodiment of the vent plate 32', mounting aperture 32' and venting channels 56'. According to this embodiment, the venting channel 56 is a portion of the mounting aperture 32' that is not filled by the vent valve 40. In the example embodiment, the mounting aperture 32' has a square shape, while the body portion 42 of the vent valve 40 has a circular shape, thus providing gaps 56' between the vent plate 32' and the vent valve 40 which serve as the venting channels 56'. The mounting aperture 32' and body portion 42 of the vent valve 40 could have other shapes to provide gaps 56' in a similar manner.

In view of the foregoing, because of the location of the venting channels 56, 56' on the vent plate 32, instead of on the vent valve 40 like prior art designs, the venting channels 56, 56' may be cut or stamped with greater precision than prior art designs because they do not have to be molded into an elastomeric part. Also, because the venting channels 56, 56' are formed in the vent plate 32, they are not prone to deformation in the same manner as venting channels formed in the elastomeric vent valve like prior art designs. Additionally, the venting channels 56, 56' are resistant to clogging by contaminants such as grease due to their size and/or shape.

Obviously, many modifications and variations of the present invention are possible in light of the above teachings and may be practiced otherwise than as specifically described while within the scope of the appended claims. Individual elements or features of a particular embodiment are generally not limited to that particular embodiment, but, where applicable, are interchangeable and can be used in a selected embodiment, even if not specifically shown or described.

What is claimed is:

1. A constant velocity joint, comprising:
   an outer race extending along an axis and defining a compartment;
   an inner race disposed in the compartment and pivotable relative to the outer race;
   a vent plate disposed in the compartment and defining a mounting aperture and at least one venting channel disposed in spaced relationship with the mounting aperture;
   a vent valve having a body portion extending along the axis and received by the mounting aperture and a rim portion extending from the body portion into biased engagement with the vent plate to cover the at least one venting channel and define a chamber between the rim portion, the body portion and the vent plate;
   the rim portion of the vent valve disposed in sealed engagement with the vent plate when a pressure in the compartment of the driveline is less than a predetermined pressure to seal the compartment from contaminants and prevent air from passing from an atmosphere between the rim portion and the vent plate; and
   the at least one venting channel fluidly connecting the chamber and the compartment of the outer race for allowing air to pass from the compartment through the at least one venting channel into the chamber and to the atmosphere between the rim portion and the vent plate during an increase of the pressure in the compartment above the predetermined pressure.

2. The constant velocity joint as set forth in claim 1 wherein the at least one venting channel includes a plurality of venting channels each disposed in spaced relationship with the mounting aperture.

3. The constant velocity joint as set forth in claim 1 wherein the rim portion of the vent valve is comprised of a flexible material.

4. The constant velocity joint as set forth in claim 1 wherein the rim portion of the vent valve extends annularly about the body portion.

5. The constant velocity joint as set forth in claim 1 wherein the body of the vent valve extends along the axis between a proximal end and a distal end.

6. The constant velocity joint as set forth in claim 5 wherein the rim portion extends from the proximal end of the vent body to the vent plate.

7. The constant velocity joint as set forth in claim 5 wherein the vent valve has a flange portion extending radially outwardly from the body portion on an opposite side of the vent plate as the rim portion and engaging the vent plate for inhibiting movement of the vent valve relative to the vent plate.

8. The constant velocity joint as set forth in claim 7 wherein the flange portion extends from the distal end of the body portion of the vent valve.

9. The constant velocity joint as set forth in claim 5 wherein the body of the vent valve has a circular cross-sectional shape taken along a plane transverse to the axis.

* * * * *